United States Patent [19]

Erhardt et al.

[11] 4,265,575
[45] May 5, 1981

[54] TOOTH-EDGE GEAR WORKING MACHINE

[75] Inventors: Manfred Erhardt, Puchheim; Max Stoeckl, Munich, both of Fed. Rep. of Germany

[73] Assignee: Carl Hurth Maschinen-und Zahnradfabrik, Munich, Fed. Rep. of Germany

[21] Appl. No.: 932,705

[22] Filed: Aug. 11, 1978

[30] Foreign Application Priority Data

Aug. 20, 1977 [DE] Fed. Rep. of Germany ....... 2737598

[51] Int. Cl.³ .......................................... B23F 19/10
[52] U.S. Cl. .................. 409/8; 51/105 GG; 51/123 G
[58] Field of Search ................ 90/1.4, 1.6 R, 4; 51/26, 56 G, 95 GH, 105 GG, 105 HB, 123 G, 287; 74/813 L, 820; 409/8, 9, 11

[56] References Cited

U.S. PATENT DOCUMENTS

| 1,923,763 | 8/1933 | Tanner | 409/8 |
| 1,985,477 | 12/1934 | Wolf | 51/123 G X |
| 3,170,333 | 2/1965 | Umbricht | 74/820 X |
| 3,859,893 | 1/1975 | Hodgson | 409/11 |
| 4,125,057 | 11/1978 | Cox | 409/74 |

FOREIGN PATENT DOCUMENTS

| 1206280 | 6/1966 | Fed. Rep. of Germany . | |
| 2065382 | 9/1970 | Fed. Rep. of Germany | 90/1.4 |
| 2044379 | 3/1974 | Fed. Rep. of Germany . | |

*Primary Examiner*—Z. R. Bilinsky
*Attorney, Agent, or Firm*—Blanchard, Flynn, Thiel, Boutell & Tanis

[57] ABSTRACT

A machine for working the edge of a tooth on a spur, bevel or similar type workpiece. The workpiece is mounted on a workpiece spindle and is supported for rotation as well as reciprocal axial movement. The workpiece spindle on which the workpiece is mounted is supported in a workpiece headstock. The workpiece headstock includes a system of gearing for effecting a continuous rotary drive of the workpiece spindle or, and in the alternative through the addition of an auxiliary housing having auxiliary gearing therein operatively connected with the main gearing in the machine for effecting an intermittent rotation of the workpiece spindle. As a result, two types of machining operations that were heretofore possible utilizing two separate machines are now possible utilizing one and the same machine.

7 Claims, 12 Drawing Figures

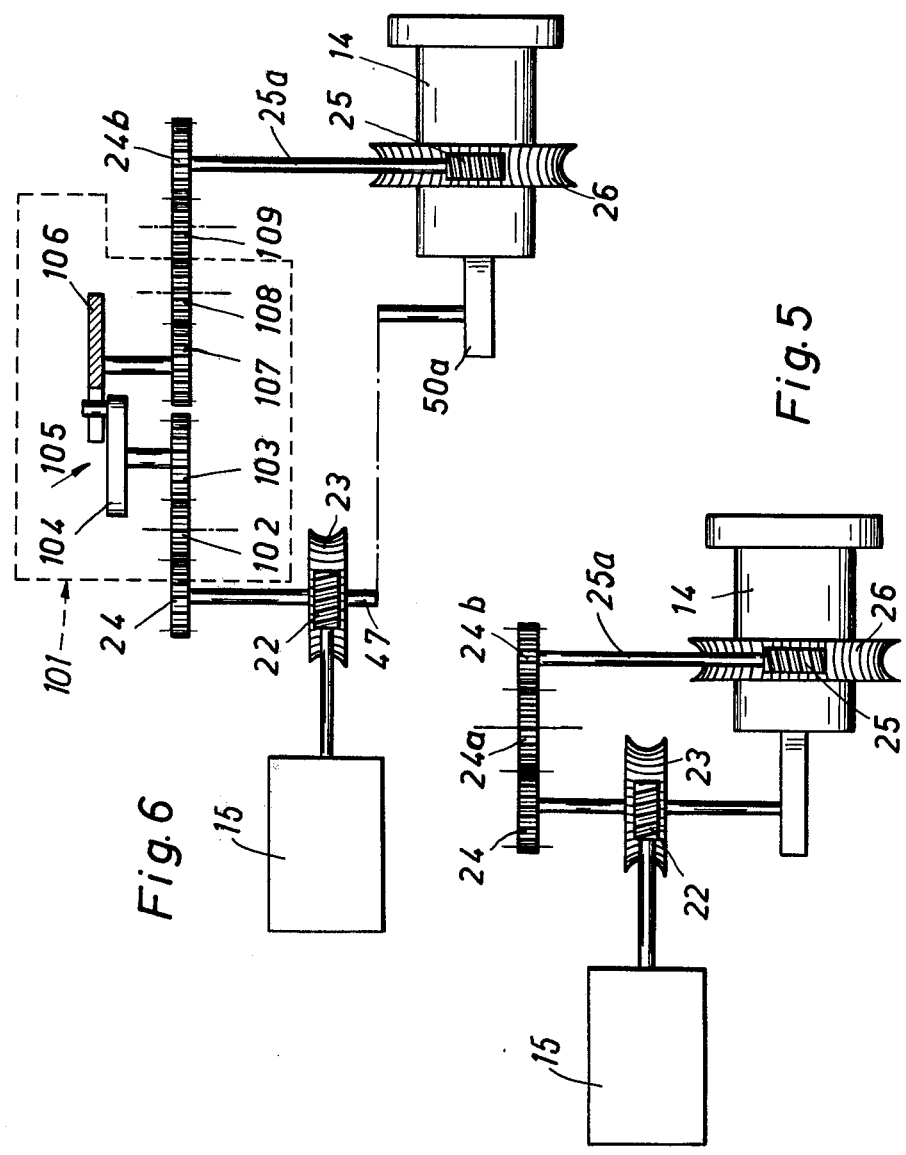

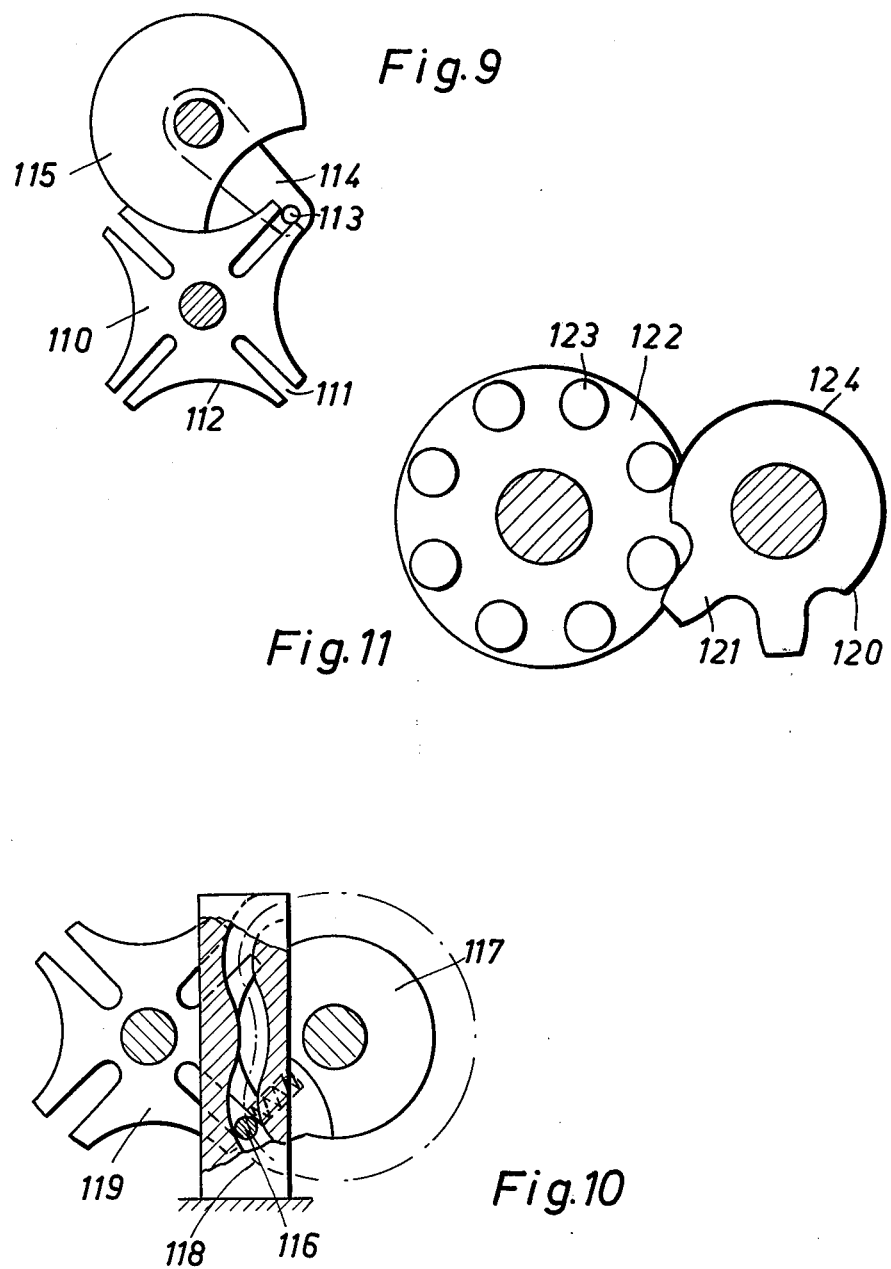

TOOTH-EDGE GEAR WORKING MACHINE

FIELD OF THE INVENTION

The invention relates to a tooth-edge working machine and, more particularly, to a machine capable of machining sharpened or sloped tooth ends and also rounded ends with a minimum of setup time.

BACKGROUND OF THE INVENTION

Tooth-edge working machines are known wherein the tooth ends of the workpieces are provided with sloped surfaces during the so-called push-milling method with a face cutter or so-called bell-shaped cutter, namely they can so to speak be sharpened or sloped, however, not rounded. (German Patent No. 1 206 280, published on June 16, 1966). Machines are also known on which the tooth ends can be rounded, however, not sloped, with an end-milling cutter or the like. (German Patent No. 2, 044 379, published on Mar. 7, 1974.)

The purpose of the invention is to provide a machine, on which the tooth ends of gears can be both sharpened or sloped and also rounded with a minimum of resetting time.

The basic purpose of the invention is attained with a machine having common drive structure for all modes of operation. Change gears are thereby economical in a machine for several workpieces. In place of change gears, it is of course also possible to provide a variable gear so that in the sense of the invention change gears and variable gears are equivalent.

An advantageous design, which corresponds so to speak with a modular structure results from a development of an additional gear housing operatively connected to the base housing of the basic machine.

A further development of the invention includes the utilization of a step drive mechanism which is advantageous for the function of the stepwise rotation of the workpiece spindle. The step drive mechanism can be attained at a small cost of construction.

The machine according to the invention has also the advantage that all axial movements for the rounding-off operation and the push-milling method (sloping) can be associated with the workpiece spindle, so that the tool headstock can be constructed very simply.

BRIEF DESCRIPTION OF THE DRAWINGS

The invention is discussed in connection wth FIGS. 1 to 11, which illustrate exemplary embodiments.

FIG. 5 illustrates a gear diagram for the rounding off with an end-milling cutter;

FIG. 6 illustrates a gear diagram with a stepping mechanism for working with a face or bell-shaped cutter;

FIG. 9 illustrates a stepping mechanism in the form of a Maltese-cross or intermittant drive transmission;

FIG. 10 illustrates a Maltese-cross or intermittent drive transmission with a device for effecting a constant rotational speed of the driven side;

FIG. 11 illustrates a stepping mechanism in form of a toothed gearlike wheel.

DETAILED DESCRIPTION

Figure 1:
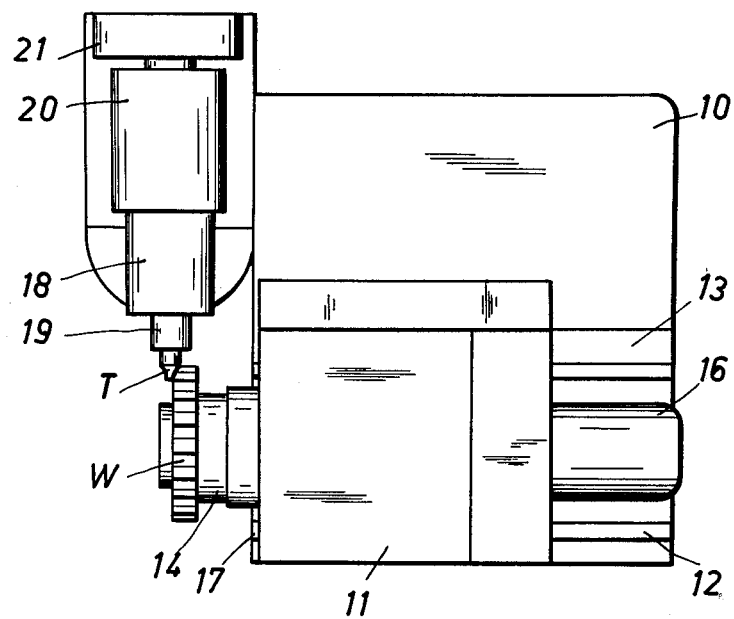
FIG. 1 is a schematic top view of a machine, embodying the invention.
Figure 2:
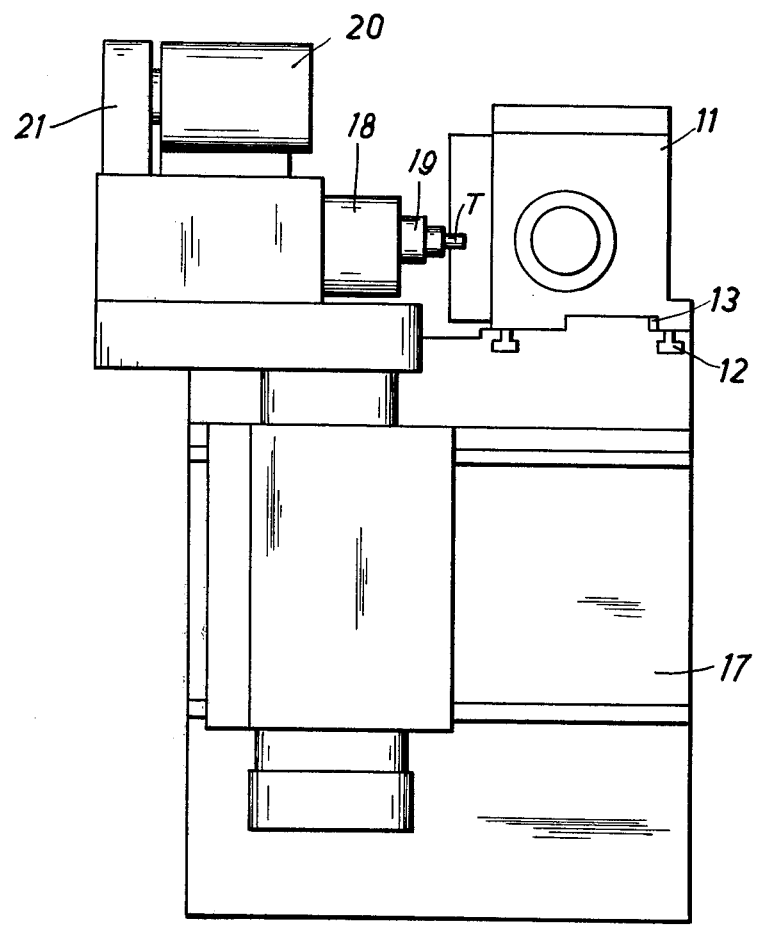
FIG. 2 is a side view of the machine according to FIG. 1.

A workpiece headstock 11 is guided for longitudinal movement on a machine frame 10 in a prismatic guide 13 or the like and is lockable in a fixed position by means of T-head bolts which are received in T-grooves 12. A workpiece spindle 14 is rotatably supported in the workpiece headstock and is driven by a motor 15 (FIG. 5, for example). A workpiece W is mounted in a conventional manner on the front end of the workpiece spindle 14. On the other end of the workpiece spindle there is provided the drive of a known automatic clamping device, for example a hydraulic clamping cylinder 16. A tool headstock 18 is supported in a conventional manner for longitudinal movement, elevational adjustment, pivotal movement about a vertical axis and is fixedly lockable in all of the aforementioned positions on a vertical wall 17 of the machine frame. A tool spindle 19 is rotatably supported in a conventional manner in the tool headstock 18, which tool spindle 19 can be rotatably driven through a gearing 21 by an electric motor 20. A tool T can be inserted and clamped in the workpiece end of the tool spindle. The tool T may be an end-milling cutter, which has the negative form of the desired chamfer on the workpiece tooth end, as is illustrated; it may, however, according to the invention also be a face cutter or bell-shaped cutter.

While during a rounding of the teeth, the tool T rotates and works the tooth ends, the workpiece also rotates about the axis of the workpiece spindle 14 and moves axially back and forth. The gearing for this will be described hereinbelow. The workpiece spindle 14 is driven from the motor 15, which may be an electric motor or a hydraulic motor, through a worm 22, a worm gear 23, through change gears 24, 24a, 24b, through further not illustrated gear elements, through a second worm 25, which is mounted on a worm shaft 25a (FIG. 8) and through a worm gear 26. The worm gear 26 is fastened to a spindle sleeve 27 by a key and is axially restrained by nuts 28. The spindle sleeve 27 is rotatably supported in a base housing 30 of the workpiece headstock by ball bearings 31, 32 and is axially restrained by conventional means. The workpiece spindle 14 is rotatably supported and longitudinally movable on the one hand in the housing 30 and on the other hand in the spindle sleeve 27.

Figure 12:
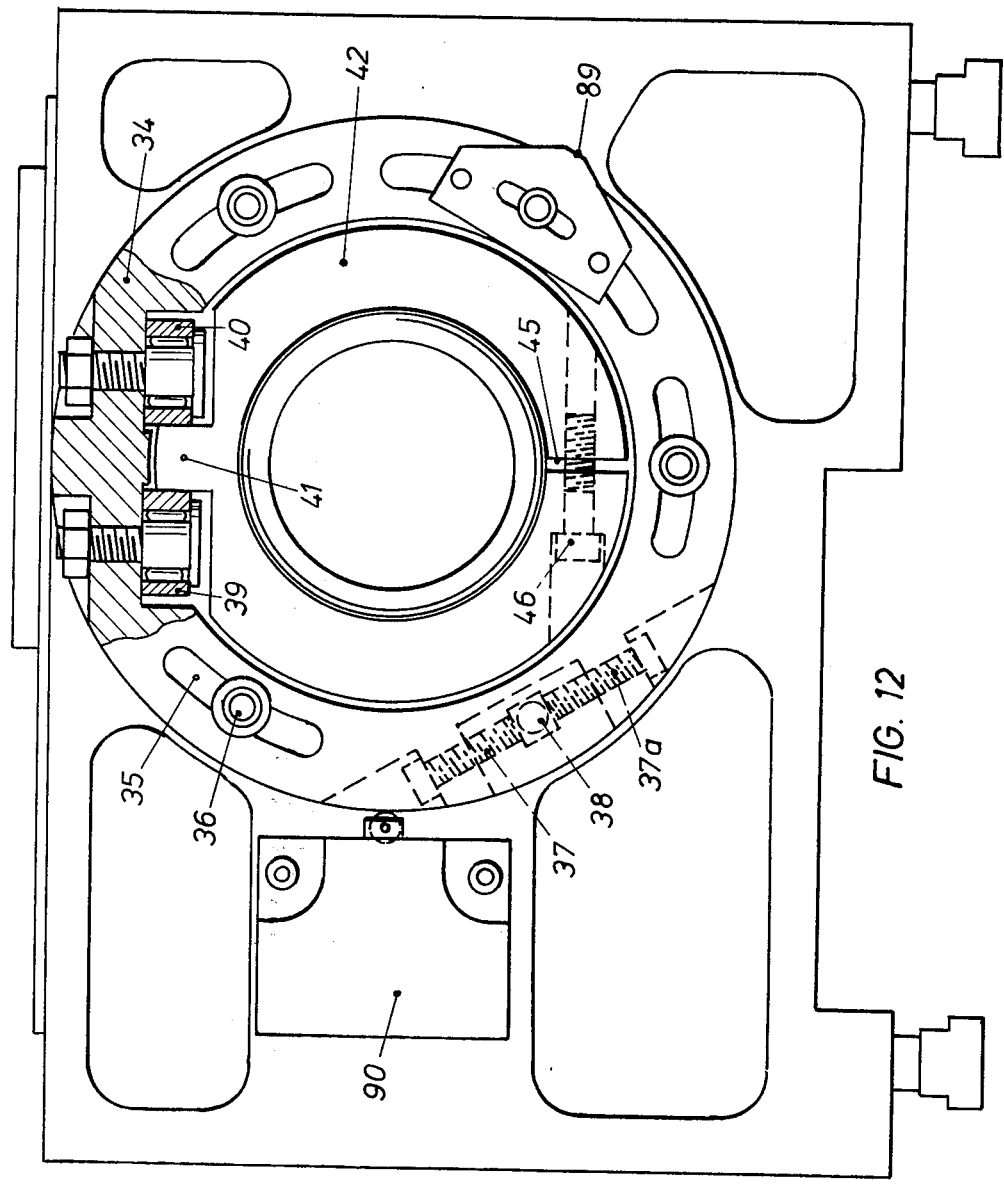
FIG. 12 is a view of the end of the spindle sleeve remote from the workpiece, when the rear cover of the housing is removed.

On the end of the spindle sleeve 27 remote from the workpiece, there is secured a guide ring 34 namely by the provision of slotted holes 35 and screws 36 in such a manner that the guide ring 34 can be angularly adjusted relative to the spindle sleeve 27. For accomplishing a fine adjustment, two adjusting screws 37, 37a are conventionally provided in the guide ring 34 (FIG. 12) and an abutment 38 is provided on the spindle sleeve 27, against which the adjusting screws can be supported. By rotating the adjusting screws, the angular position of the guide ring 34 with respect to the spindle sleeve 27 can be adjusted and can be fixedly secured by the screws 36. Two guide rollers 39, 40 are rotatably supported on bolts in the guide ring 34. Both guide rollers are spaced from one another a certain distance, which distance is occupied by a rib 41. The rib 41 is positioned on a clamping ring 42, which is secured against rotation on the workpiece spindle 14 by means of an adjusting ring 43 and is axially restrained by snap rings or the like. The clamping ring 42 has a radial slot 45 therein. Clamping screws 46 are provided at a right angle thereto. The clamping ring 42 is secured to the workpiece spindle 14 without play by the slot and these clamping screws. The guide ring 34 and the clamping ring 42 produce an adjustable dependency between the rotary movement and the later described back and forth movement of the workpiece, namely, by making the angular position between the workpiece spindle 14 and the spindle sleeve 27 adjustable. On the end of the workpiece spindle remote from the workpiece, there is provided a not shown thread for mounting an automatic workpiece clamping device, for example, the clamping cylinder 16.

A cam plate 50 is secured against rotation and exchangeably fastened with an anchor bolt 49 on a shaft 47 of the aforementioned worm gear 23. The cam plate 50 controls the course of the back and forth movement of the workpiece W after selectively changing the same for rounding off the tooth ends or for the back and forth movement of the workpiece relative to the tool for the so-called push-milling method for sharpening or sloping the tooth ends.

A lever 52 (FIG. 8) is pivotally supported in the housing 30, on which lever is rotatably supported a first roller 53. The axes of the cam plate 50 and of the first roller 53 are substantially parallel. A pressure plate 54 is secured to the lever 52. A second roller 55 is rotatably supported in a slide member 56, which is movably guided in a carriage 57 and engages the pressure plate 54. The direction of movement of the slide member 56 extends substantially at a right angle with respect to the plane containing the axes of the cam plate 50 and the first roller 53. The carriage 57 is guided longitudinally movably in the housing 30 parallel to the axis of the workpiece spindle 14. For this purpose, guide elements 58, 59 are provided in the housing and slidably support the carriage 57. Not illustrated means are also provided for preventing a lifting of the carriage 57 off from the bars. Rollers 60, 61, 62, 63 are rotatably supported below the carriage 57, which rollers extend between the guide elements and laterally guide the carriage 57. At least one of the rollers is supported in an eccentric sleeve 64, so that the respective roller can be adjusted clearancefree in relationship to the guide element 58. The slide member 56 has a spindle nut 65 fixedly secured thereon and into which is threadedly received a screw spindle 66. The screw 66 has a squared end 66a onto which a key or tool can be placed. By rotating the screw spindle 66, the carriage 57 and thus the second roller 55 are adjusted relative to and along the lever 52 which carries the first roller 53 to cause the amount of lift acting onto the carriage 57 to be changed. As will be described in more detail below, the carriage 57 acts onto the workpiece spindle 14 so that with the described adjusting device, the path length of the back and forth moving workpiece can be selected.

Figure 8:
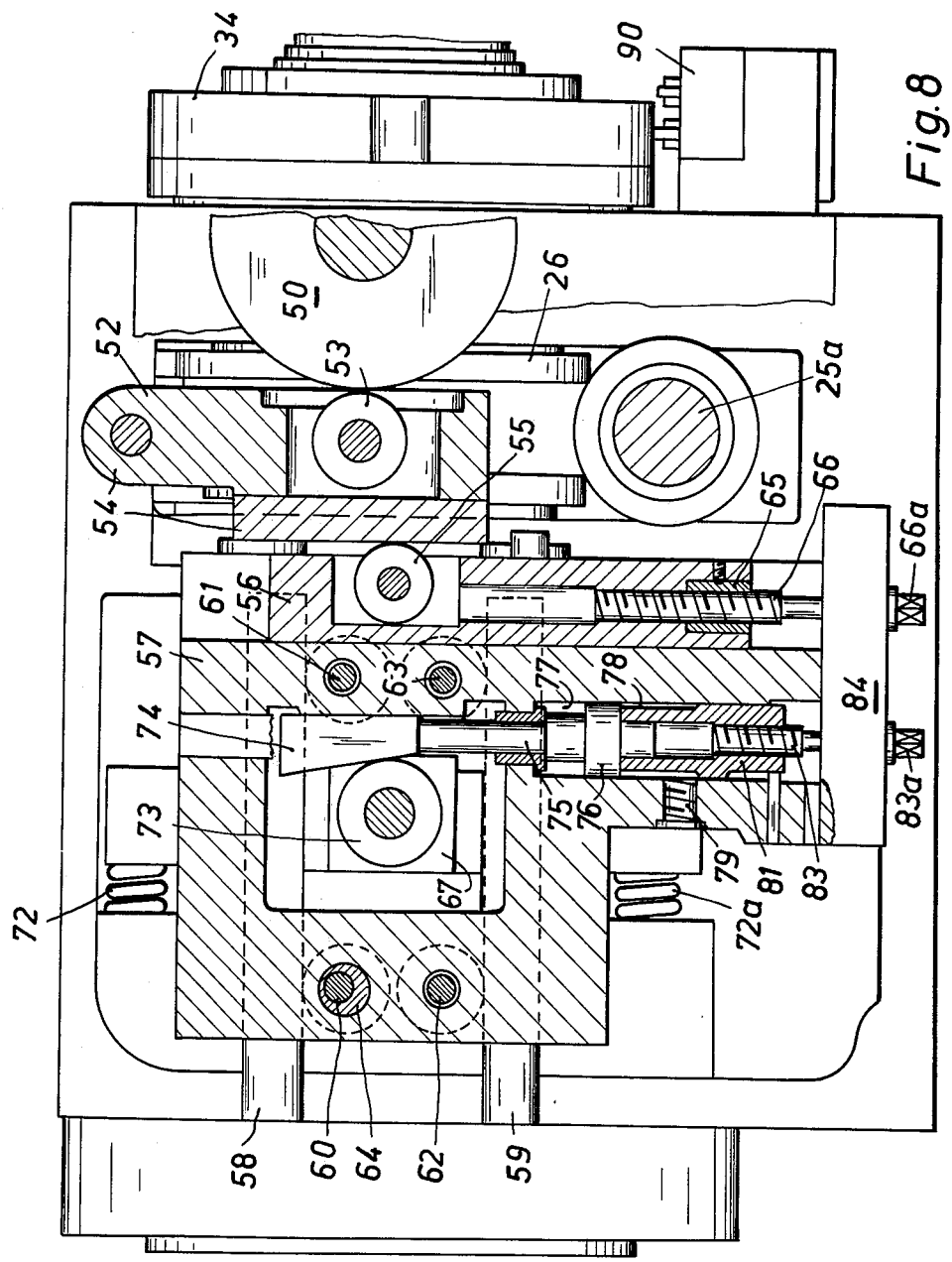
FIG. 8 is a cross-sectional view of the gear according to FIG. 7 in a different plane.

A plate 67 is rotatably supported on the workpiece spindle 14 and is axially restrained by roller bearings 69, 70 or the like and a nut 71. The plate 67 is secured against rotation relative to the housing. A resilient or variable axial force is applied onto said plate 67, preferably by springs 72, 72a. This axial force constantly urges the workpiece spindle 14 and thus the workpiece away from the tool. A third roller 73 is rotatably supported on the plate 67 in the area of the already mentioned carriage 57. The mentioned springs urge through the plate 67 the roller against a wedge 74 which abuts against the carriage 57 and is movably guided therein. The wedge 74 has a piston rod 75 secured thereto. A piston 76 is provided on the end of the piston rod 75. The piston 76 is movably guided in a cylinder to form two chambers 77, 78 on opposite sides of the piston. Each of the chambers are supplied with a pressure medium, for example with oil, through a connecting piece, of which one is shown and is identified with reference numeral 79. The magnitude of the stroke of the piston is limited toward the one side by an adjustable stop piston 81. A fixed stop is provided for limiting the stroke movement to the other side. The stop piston 81 is longitudinally movably guided in the cylinder and is secured against rotation. It is provided with an internal thread, into which engages a screw spindle 83. The screw spindle 83 is supported, like the aforementioned screw 66, on a bar 84 which is secured to the carriage 57. Just like the screw 66, the screw 83 also projects from the bar and has a squared end 83a thereon onto which a key or tool can be placed. By rotating the screw 83, the stop piston 81 can be moved or adjusted. As a result, the position of the wedge 74 is adjusted. FIG. 8 illustrates the stop piston 81 in a position so that the wedge cannot be adjusted at all. If according to FIG. 8, the stop piston 81 is moved farther downwardly, then depending on which of the two chambers 77, 78 is filled with pressure oil, the wedge can assume two positions which correspond to two different spacings of the plate 67 or the workpiece spindle 14 or the workpiece from the stationarily supported cam plate 50 and thus also from the stationarily supported tool. These two positions of the wedge or of the workpiece relative to the tool are utilized for a so-called double-shear method. That is, in the first position of the wedge, for example, the rounding off at the tooth ends is rough cut and in the second position is finish cut during a second cut.

On the end of the spindle sleeve 27 or the workpiece spindle 14 remote from the workpiece, cams 89 are adjustably arranged, and which cooperate with switches 90. Furthermore the shaft 47, which carries the cam plate 50 is provided with a cam sleeve 91, which cooperates with a switch 92. The cams and switches facilitate an automatic working sequence of the machine.

Figure 3:
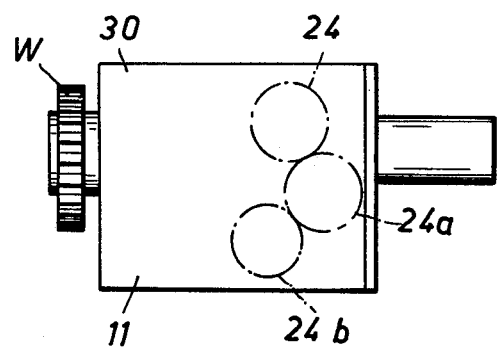
FIG. 3 schematically illustrates a workpiece headstock with change gears for the rounding-off operation.

FIG. 3 schematically illustrates the described workpiece headstock, which is set for rounding off the tooth ends. FIG. 5 illustrates further detailing of the gear diagram for the workpiece headstock.

Figure 4:
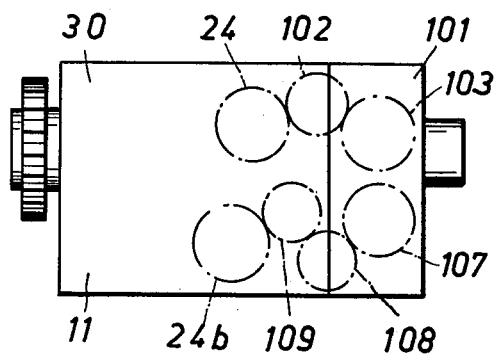
FIG. 4 illustrates the workpiece headstock according to FIG. 3, which is supplemented through an additional housing for sharpening or sloping the tooth ends.
Figure 7:
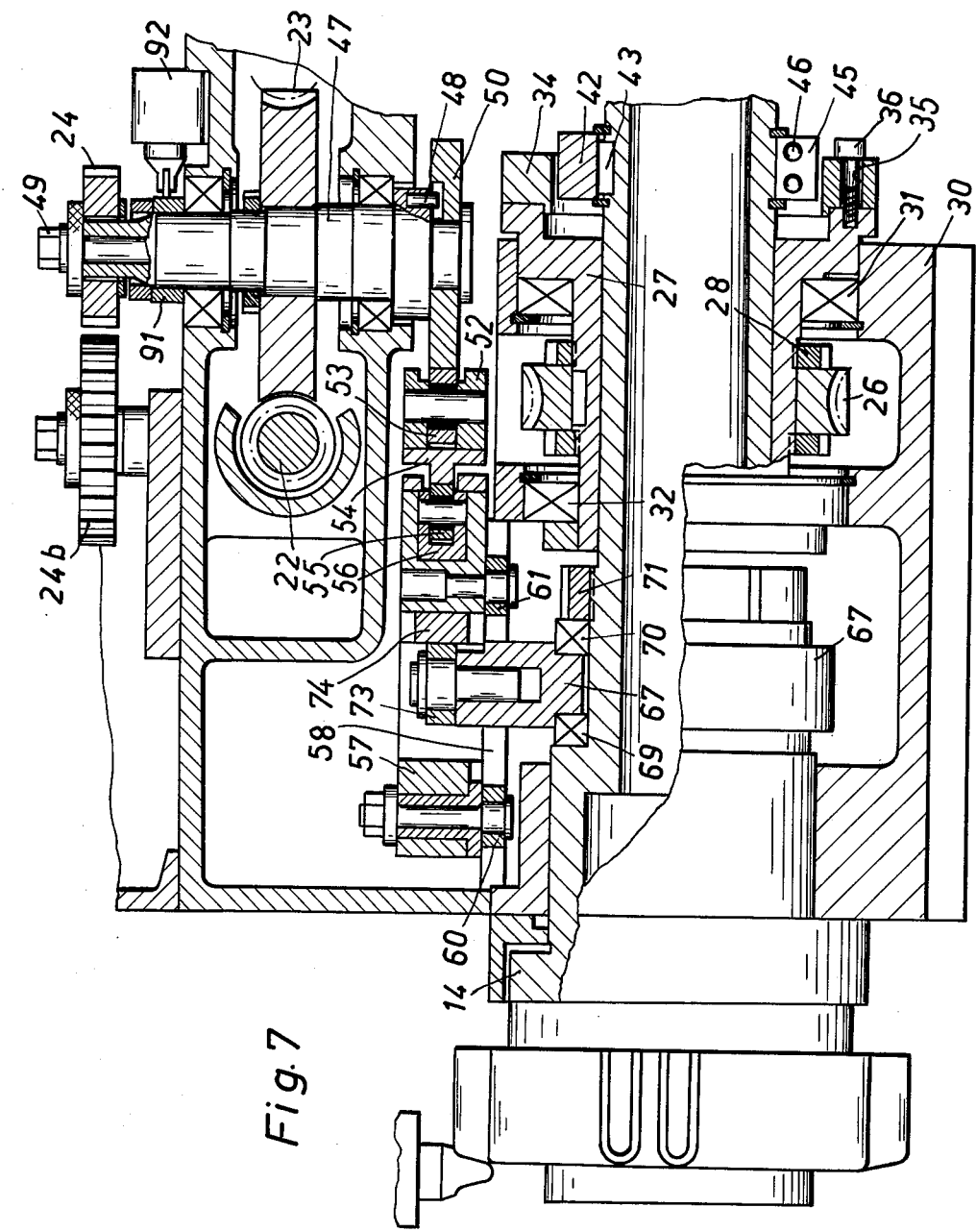
FIG. 7 is a cross-sectional view of the gear in the base housing for the drive of the workpiece spindle.

FIG. 4 illustrates the workpiece headstock 11 in which an additional housing 101 is secured to the base housing 30, in order to set up the machine for sharpening or sloping the tooth ends in the push-milling method. FIG. 6 illustrates the further detailing of the gear diagram for the workpiece headstock. The gear train extends first, as was described earlier, from the motor 15 through the worm 22, the worm gear 23 onto the change gear 24. The change gear 24 mates with a first intermediate gear 102, which can also be supported in the base housing 30. The first intermediate gear engages a drive gear 103, which is coupled with a drive member 104 of a stepping or intermittent drive mechanism 105. The drive member drives a driven member 106 of said stepping mechanism, which is coupled with a driven gear 107. The drive and the driven gear and thus also the intermittent drive mechanism are supported in the additional housing 101. The driven gear 107 mates with a second intermediate gear 108, which engages a third intermediate gear 109. The third intermediate gear drives the change gear 24b, which is coupled with the worm 25 to effect a drive of the workpiece spindle through the worm gear 26. The change gear is supported in the base housing 30. If desired, the last-mentioned intermediate gears can also be supported in the base housing. A cam plate 50a is also positioned on the shaft 47 in this arrangement which cam plate, however, has for the push-milling method usually a different contour than for the rounding-off operation.

FIG. 9 illustrates as an example for an intermittent drive mechanism a conventional, so-called Maltese-cross transmission. The driven member is composed of a driven gear 110, which has four wings each with a radial slot 111 therein. The driven gear 110 has concave contours 112 located between the wings. A pin 113 is used as a drive member, which pin is arranged at the end of a rotatably supported arm 114 and is received in the aforementioned slots 111. A ratchet wheel 115 is arranged coaxially with the arm 114 and fixedly connected thereto to rotate therewith. In addition, the ratchet wheel has a convex contour over three-fourths of its periphery so that this part fits into the concave contour of the driven gear 110 between the slots 111. The receipt of the convet portion in the concave portion is used as a lock against rotation. One-fourth of the periphery of the wheel 115 has a concave contour of facilitate a rotation of the driven gear 110. During one rotation of the drive gear 115 the driven gear carries out stepwise ¼ of a rotation.

In the Maltese-cross transmission according to FIG. 10, the pin 116 which corresponds to the pin 113 is radially resiliently supported in the drive gear 117. During the force transmitting phase, the pin 116 engages a curved-guiding mechanism 118, which guides the pin on an arc about the axis of the driven gear 119. As a result, it is achieved that—differing from the embodiment according to FIG. 9—the driven gear rotates at substantially a constant peripheral speed (during the force transmitting phase).

FIG. 11 illustrates a different embodiment of a stepping mechanism. The drive member is a drive gear 120, which has only one or two teeth 121. For example, approximately three-fourths of the periphery has no teeth. This toothless convex part of the periphery serves as a block against rotation for the driven gear 122. The intermittent drive mechanism has a mangle gear 123, the pitch of which corresponds with the pitch or tooth thickness of the gear-tooth system on the drive gear. The periphery 124 of the nontoothed part of the drive gear is tangent with the mangle gear 123 so that an unintentional rotation of the driven gear is prevented. A more secure, clearancefree transmission of the stepwise rotation takes place, if two drive gears similar with 124 are provided.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a tooth edge working machine for working the face edges of spur, bevel and similar type gears, said machine having a workpiece spindle mounted on a workpiece headstock and a tool spindle, said workpiece spindle being adapted to receive a workpiece thereon, a first motor for driving said workpiece spindle, at least one tool clampingly received in said tool spindle and a second motor for driving said tool spindle, the improvement comprising wherein said workpiece headstock is selectively provided with at least one of (1) a first gear train and gear drive means coupling said first gear train to said workpiece spindle and said first motor for effecting a continuous rotary drive of said workpiece spindle driven by said first motor and (2) a second gear train which contains a means for effecting an intermittent rotation of the said workpiece spindle drivingly coupled to said gear drive means coupled to said workpiece spindle and said first motor, said first gear train including at least one gear and means for removably supporting said one gear in said first gear train and when removed a space is defined, said second gear train being insertable into said space of said removed gear to thereby effect the change from a continuous rotary drive of said workpiece spindle to an intermittent drive thereof.

2. The machine according to claim 1, wherein said workpiece headstock contains a base housing, to which is selectively mounted an additional housing which contains said second gear train for effecting said intermittent rotation of said workpiece spindle.

3. The machine according to claim 1, wherein said means for effecting an intermittent rotation is an intermittent drive mechanism having an input member and a rotatable output member, said input member being drivingly coupled to said gear drive means, and said rotatable output member having a substantially constant speed.

4. The machine according to claim 3, wherein said intermittent drive mechanism is a Maltese-cross transmission with a control cam for generating said substantially constant speed of the rotary portion of said output member.

5. The machine according to claim 3, wherein said intermittent drive mechanism contains a drive gear with at least one tooth, the tooth flanks of which include means for effecting an at least partly constant rotary speed of said output member.

6. The machine according to claim 5, wherein said intermittent drive mechanism is provided with a lock for preventing a reverse rotation of said output member.

7. The machine according to claim 2, wherein said gear drive means has at least two gears and wherein at least said two gears are supported in said base housing and at least said means for effecting said intermittent rotation of said workpiece spindle is supported in said additional housing.

* * * * *